Oct. 10, 1950     J. B. SCOTT     2,525,563
PULLEY CONVERTER
Filed Jan. 29, 1948
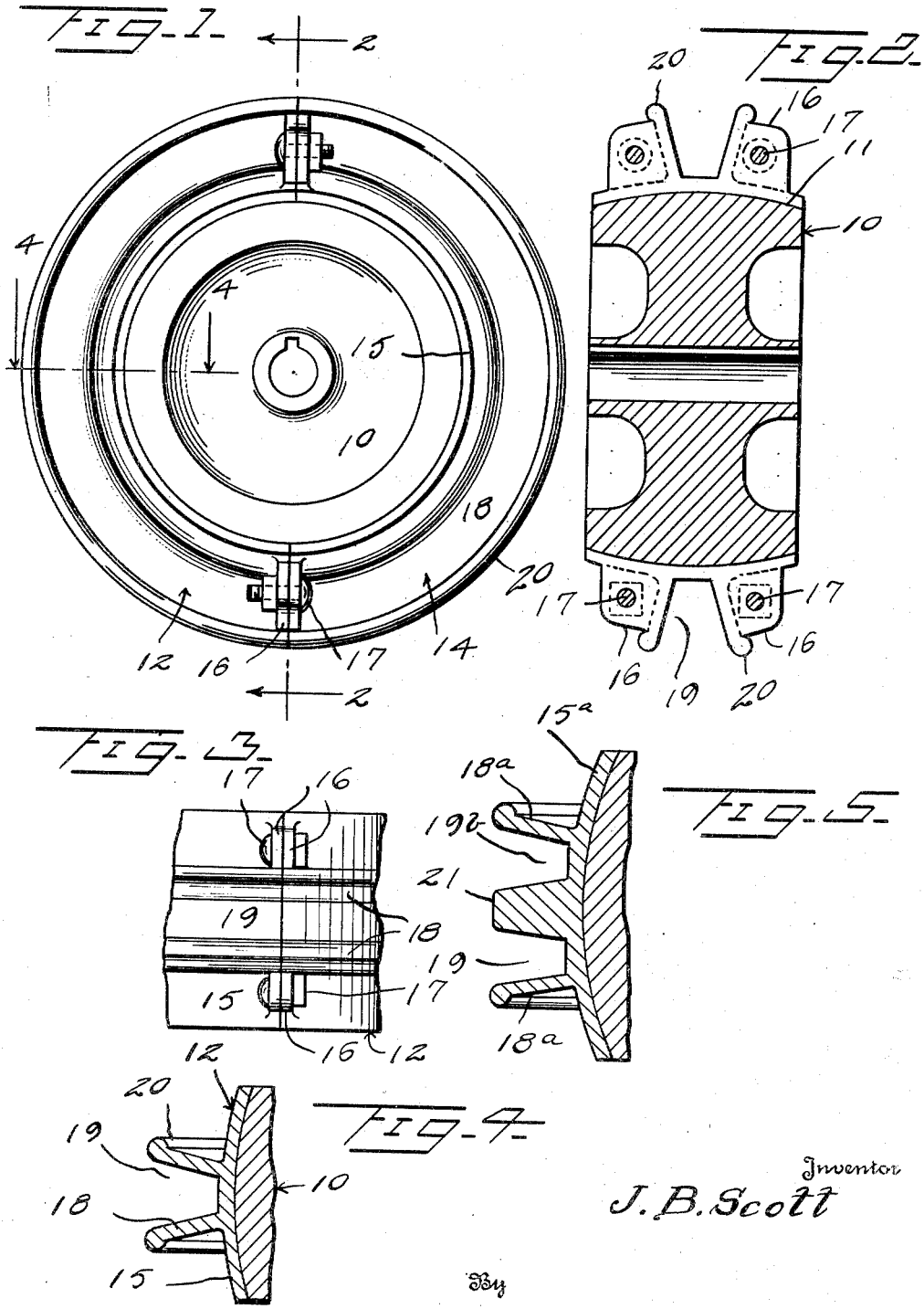
Inventor
J. B. Scott
By
Kimmel & Crowell Attys.

Patented Oct. 10, 1950

2,525,563

UNITED STATES PATENT OFFICE 2,525,563

PULLEY CONVERTER

Jerome B. Scott, Abilene, Tex.

Application January 29, 1948, Serial No. 5,027

1 Claim. (Cl. 74—230.5)

This invention relates to a converter for transforming a flat type pulley into a V or round type pulley.

An object of this invention is to provide a pulley converter which is formed of complementary halves engageable over the periphery of a flat type pulley and adapted to be tightly clamped thereto, the converter having at least one outer channel for receiving either a V or round belt.

Another object of this invention is to provide a pulley converter of this kind which can be easily and quickly mounted on a pulley without removing the pulley from the shaft or the shaft from its bearings.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a detailed end elevation of a pulley having a converter constructed according to an embodiment of this invention mounted thereon.

Figure 2 is a sectional view taken on the line 2—2 of Figure 1.

Figure 3 is a fragmentary plan view of the device.

Figure 4 is a fragmentary sectional view taken on the line 4—4 of Figure 1.

Figure 5 is a fragmentary sectional view of a modified form of this invention.

Referring to the drawing, the numeral 10 designates generally a conventional pulley which is formed with an arched rim or peripheral surface 11. The surface 11 is a conventional surface for use with a flat belt and in order to provide for converting the pulley 10 into a pulley which may be engaged by a V belt, I have provided a pair of semi-circular rim members, generally designated as 12 and 14. The rim members 12 and 14 are of like construction and each includes an inner semi-circular base or body 15 which is adapted to tightly engage the arched peripheral surface 11 of the pulley 10.

The two semi-circular rim members 12 and 14 have confronting pairs of ears 16 which are clamped together by means of bolts 17. The base or inner semi-circular members 15 have extending outwardly therefrom outwardly divergent walls 18 forming a V space 19 therebetween to receive a V belt. The outer edges of the divergent flanges 18 terminate in rolled beads 20 as shown in Figure 4. The structure shown in Figures 1 to 4, inclusive, provides for the mounting of a single V belt on the pulley 10, whereas in Figure 5 there is disclosed a modified form of this invention wherein a pair of V belts may be mounted on the pulley 10. The transversely curved semi-circular clamping members or bases 15a which are similar to the clamping members or bases 15 have extending therefrom outwardly divergent flanges 18a which are spaced apart a relatively wide distance and a semi-circular intermediate flange 21 engages between the flanges 18a so as to thereby form spaced V grooves 19a and 19b. It will, of course, be understood that there may be as many of these V grooves 19a and 19b as may be desired, depending upon the transverse dimension of the clamping member 15a and the width of the pulley 10.

This converting rim construction as hereinbefore described being formed of complementary semi-circular rim members can easily and quickly be mounted on a flat belt pulley without removing the pulley from the shaft. The converting members 12 and 14 are applied to the outer surface 11 of the pulley 10 after first removing the belt and the complementary members 12 and 14 are then tightly clamped onto the surface 11 of the pulley 10 by means of the clamping bolts 14. The ears 16 not only provide means whereby the complementary members 12 and 14 may be clamped together but also provide reinforcing means for the divergent flanges 18.

I claim:

A pulley converter comprising a pair of complementary semi-circular members engageable about the rim of the pulley, each of said members being of a width co-extensive with that of the pulley the inner surface of each member being of concavely arcuate cross section in conformity to the convexity of a standard pulley, a pair of outwardly extending divergent groove forming flanges carried by each member and symmetrically disposed relative thereto and spaced inwardly from the opposite side edges thereof, a rolled belt guiding peripheral bead carried by each flange, a pair of ear forming webs integral with said pair of flanges and said member at each end of each of said pair of members, and bolts engaging through said webs for clamping said members together and about the pulley.

JEROME B. SCOTT.

REFERENCES CITED

The following references are of record in the file of this patent:

UNITED STATES PATENTS

| Number | Name | Date |
|---|---|---|
| 1,402,489 | Fowler | Jan. 3, 1922 |
| 1,593,936 | Goodwin | July 27, 1926 |
| 1,682,927 | Nielsen | Sept. 4, 1928 |